United States Patent
Wu

(10) Patent No.: US 9,596,810 B2
(45) Date of Patent: Mar. 21, 2017

(54) GARDENING SCISSOR

(71) Applicant: Shih-Piao Wu, Changhua (TW)

(72) Inventor: Shih-Piao Wu, Changhua (TW)

(73) Assignee: Jiin Haur Industrial Co. Ltd., Changhua (TW)

( * ) Notice: Subject to any disclaimer, the term of this patent is extended or adjusted under 35 U.S.C. 154(b) by 158 days.

(21) Appl. No.: 14/586,811

(22) Filed: Dec. 30, 2014

(65) Prior Publication Data
US 2016/0183475 A1 Jun. 30, 2016

(51) Int. Cl.
*B26B 13/00* (2006.01)
*A01G 3/02* (2006.01)

(52) U.S. Cl.
CPC .................... *A01G 3/021* (2013.01)

(58) Field of Classification Search
CPC ...... A01G 3/021; A01G 3/02; A01G 2003/23; B26B 13/16; B26B 13/18; B26B 13/00
USPC .......... 30/254–262, 234, 244, 161–162, 190, 30/192, 249–251; D8/5
See application file for complete search history.

(56) References Cited

U.S. PATENT DOCUMENTS

| | | | | |
|---|---|---|---|---|
| 2,816,359 A * | 12/1957 | Hogue | ..................... | A01G 3/02 30/239 |
| 4,156,311 A * | 5/1979 | Wallace | .................. | B26B 13/14 30/262 |
| 6,643,937 B1 * | 11/2003 | Wu | .......................... | A01G 3/02 30/261 |
| 6,938,346 B1 * | 9/2005 | Huang | .................... | B26B 13/26 30/192 |
| 7,127,819 B1 * | 10/2006 | Huang | .................. | B23D 21/06 30/251 |
| 7,454,837 B2 * | 11/2008 | Shan | ........................ | A01G 3/02 30/251 |
| 8,079,150 B2 * | 12/2011 | Huang | .................... | A01G 3/02 30/254 |
| 8,549,757 B2 * | 10/2013 | Wu | .......................... | A01G 3/02 30/194 |
| 8,601,698 B2 * | 12/2013 | Huang | .................... | A01G 3/02 30/123 |
| 9,066,473 B2 * | 6/2015 | Podlesny | ............... | A01G 3/021 |
| 9,144,201 B2 * | 9/2015 | Vanttila | .................... | A01G 3/02 |
| 9,351,447 B2 * | 5/2016 | Kubik | ...................... | A01G 3/02 |
| 2007/0266568 A1 * | 11/2007 | Lin | .......................... | A01G 3/02 30/134 |
| 2010/0139100 A1 * | 6/2010 | Mortensen | ............. | B26B 17/02 30/92 |

* cited by examiner

*Primary Examiner* — Ghassem Alie
*Assistant Examiner* — Bharat C Patel
(74) *Attorney, Agent, or Firm* — Che-Yang Chen; Law Offices of Scott Warmuth

(57) ABSTRACT

A gardening scissor includes a first cutting unit, a second cutting unit, and a control rod. Each of the first and second cutting units has a tool portion, and one end of each of the tool portions has a first handle and a second handle. The first and second cutting units are pivotally connected together through first and second through holes. An axial hole is formed near the first through hole, and one side of the axial hole has a gap to connect with the step-shaped space. An extending wing that is protruding out from the second handle is formed at a rear portion of the tool portion. When the control rod is inserted into the axial hole and connected with a stopping unit, the control rod can be restricted by the stopping unit and cannot be laterally separated from the axial hole.

3 Claims, 7 Drawing Sheets

GARDENING SCISSOR

FIELD OF THE INVENTION

The present invention is related to a gardening scissor, and more particularly to a gardening scissor with an adjustable cut opening that can be used for tree branches with various sizes.

BACKGROUND OF THE INVENTION

Conventionally, a gardening scissor usually has two blades that have handles at the rear ends. A through hole is formed at each blade at the middle section thereof, and a screw and a nut pass through the through hole to hold the blades to a predetermined position. When force is applied to the handles, the through holes are used as an axis so the gardening scissor can be used when the opening of the blades is either open or closed.

However, the conventional gardening scissor has the following problems: (1) the opening of the blades is fixed and not adjustable, however, the size of the tree branch is unpredictable, and the scissor with fixed opening cannot be used for thicker tree branches; and (2) since the opening of the blades is fixed, the user has to have multiple gardening scissors for tree branches with different sizes, which increases the costs and is inconvenient for the user.

Therefore, there remains a need for a new and improved gardening scissor with adjustable opening to overcome the problems stated above.

SUMMARY OF THE INVENTION

To solve the problems stated above, the present invention provides a gardening scissor may include a first cutting unit, a second cutting unit, and a control rod. Each of the first cutting unit and second cutting unit has a tool portion, and the tool portions are corresponding to each other as knife and knife anvil. A rear portion of each of the tool portions has a first handle and a second handle. The first handle has a first through hole and the second handle has a second through hole for a connecting unit, so that the first cutting unit and second cutting unit can be pivotally connected together. Furthermore, by pressing the first handle and second handle, the status of the tool portions can be changed. It is noted that the tool portion of the first cutting unit is disposed on one side of the first handle, so a step-shaped space is formed between the tool portion and first handle to engage the tool portion of the second cutting unit. An axial hole is formed near the first through hole of the first handle, and one side of the axial hole has a gap to connect with the step-shaped space. An extending wing that is protruding out from the second handle is formed at a rear portion of the tool portion, so the extending wing is configured to pass through the gap during the second cutting unit's cutting process. The control rod has a connecting portion, a control piece, and an edge at a center portion of the control rod. When the control rod is inserted into the axial hole and connected with a stopping unit through the connecting portion outside the axial hole, the control rod can be restricted by the stopping unit and cannot be laterally separated from the axial hole. The control piece is configured to operate the control rod to align or escape the edge with the gap of the first cutting unit.

Comparing with conventional gardening scissors, the present invention is advantageous because (i) the cut opening of the gardening scissor can be adjusted according to the size of the tree branch, so the user does not have to worry whether the tree branch is too thick to cut; and (ii) since the gardening scissor can used for most of the tree branches, so it is convenient for the user who does not have to prepare multiple scissors.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
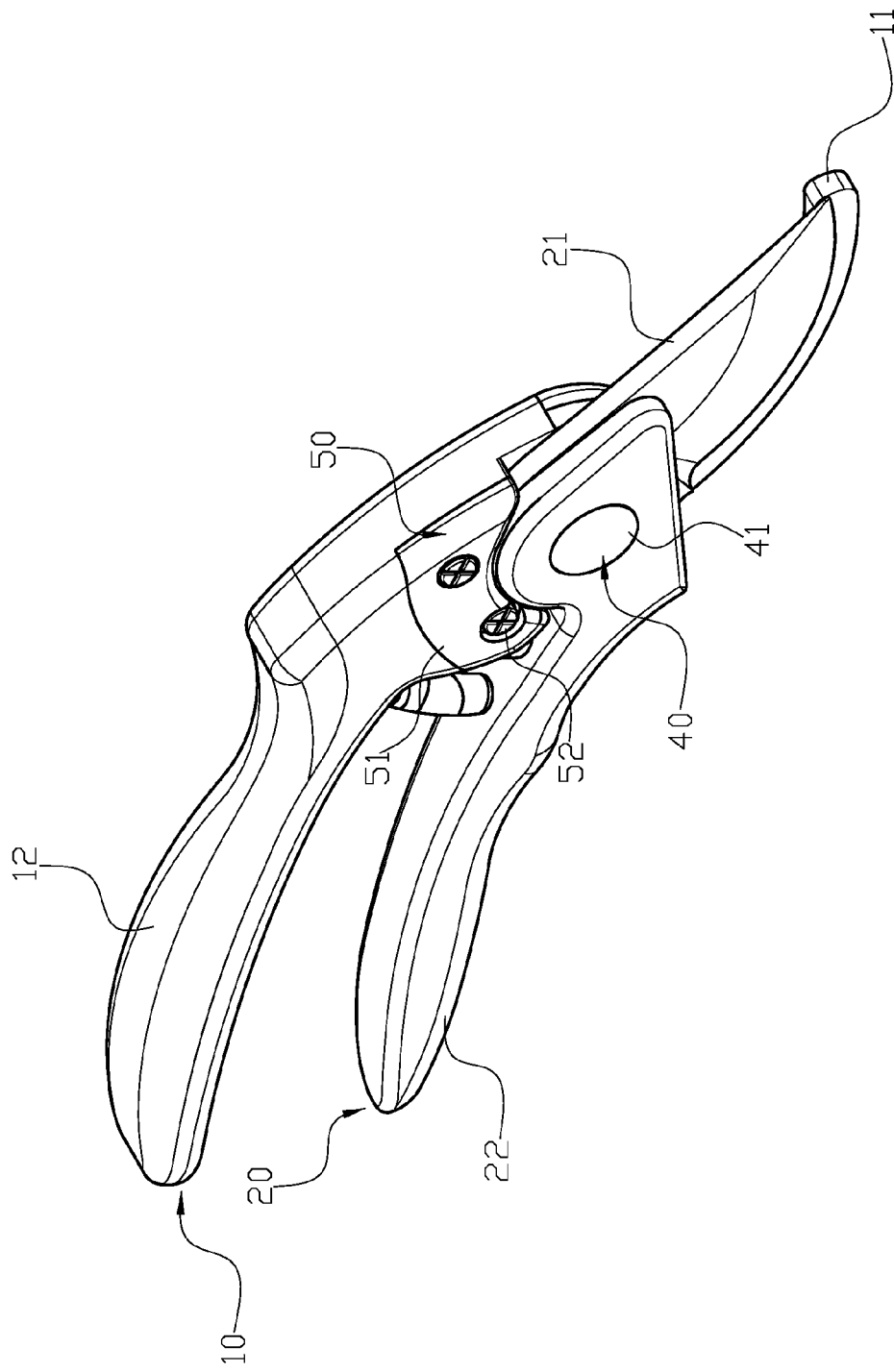
FIG. 1 illustrates a three-dimensional view of the gardening scissor in the present invention.
Figure 2:
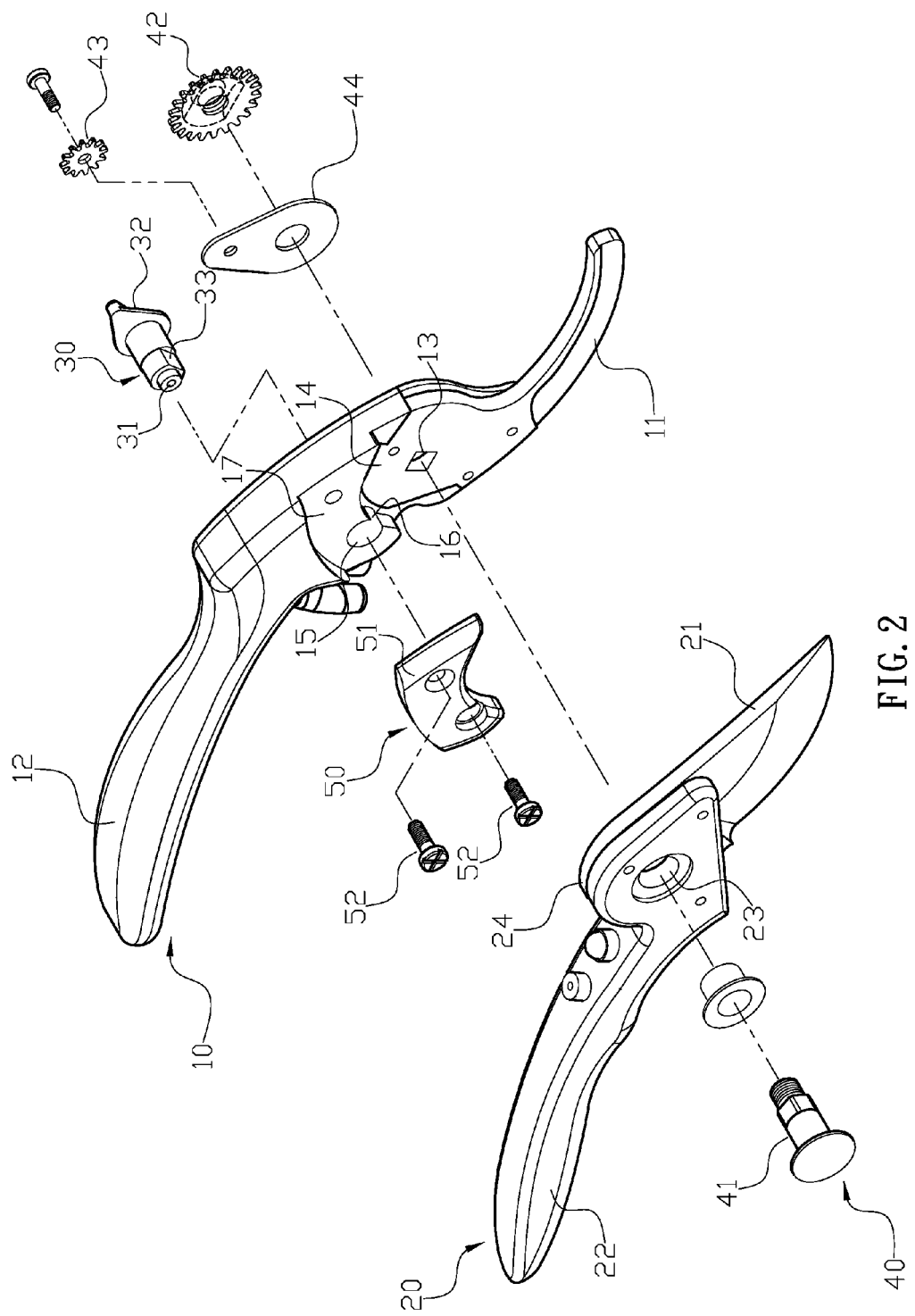
FIG. 2 illustrates an exploded view of the gardening scissor in the present invention.
Figure 3:
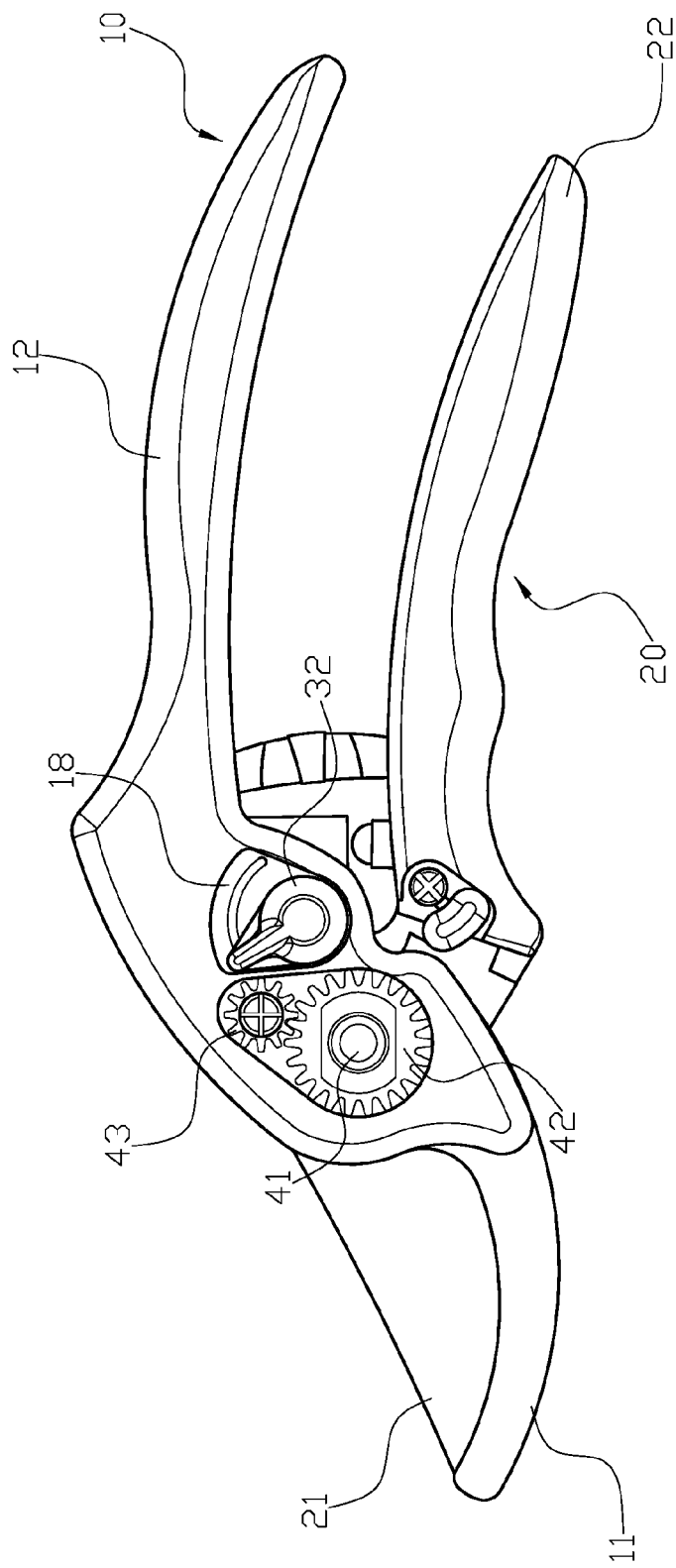
FIG. 3 illustrates a two-dimensional view of the gardening scissor in the present invention.

In order to further understand the goal, characteristics and effect of the present invention, a number of embodiments along with the drawings are illustrated as following:

Referring to FIGS. 1 to 3, an adjustment structure of a gardening scissor may include a first cutting unit (10), a second cutting unit (20), and a control rod (30). Each of the first cutting unit (10) and second cutting unit (20) has a tool portion (11) and (21) respectively, and the tool portions (11) and (21) are corresponding to each other as a knife and a knife anvil. A rear portion of each of the tool portion (11) (21) has a first handle (12) and a second handle (22) respectively. The first handle (12) has a first through hole (13) and the second handle (22) has a second through hole (23) for a connecting unit (40), so that the first cutting unit (10) and second cutting unit (20) can be pivotally connected together. Furthermore, by pressing the first handle (12) and second handle (22), the status of the tool portions (11) and (21) can be changed. It is noted that the tool portion (11) of the first cutting unit (10) is disposed on one side of the first handle (12), so a step-shaped space (14) is formed between the tool portion (11) and first handle (12) to engage the tool portion (21) of the second cutting unit (20). An axial hole (15) is formed near the first through hole (13) of the first handle (12), and one side of the axial hole (15) has a gap (16) to connect with the step-shaped space (14). An extending wing (24) that is protruding out from the second handle (22) is formed at a rear portion of the tool portion (21), so the extending wing (24) is configured to pass through the gap (16) during the second cutting unit (20)'s cutting process. The control rod (30) has a connecting portion (31), a control piece (32), and an edge (33) at a center portion of the control rod. When the control rod (30) is inserted into the axial hole (15) and connected with a stopping unit (50) through the connecting portion (31) outside the axial hole (15), the control rod (30) can be restricted by the stopping unit (50) and cannot be laterally separated from the axial hole (15). The control piece (32) is configured to operate the control rod (30) to align or escape the edge (33) with the gap (16) of the first cutting unit (10).

In one embodiment, the connecting unit (40) has a latch (41), a teethed nut (42) and a locking gear (43). The latch (41) is configured to pass through the first through hole (13) and second through hole (23) and then connected with the teethed nut (42). Through the engagement of the teethed nut (42) and locking gear (43), the teethed nut (42) will not be loosened when the first handle (12) and second handle (22) are pressed. The connecting unit (40) may further include a supporting unit (44) to hold the teethed nut (42) and the locking gear (43), so the teethed nut (42) and the locking gear (43) can be disposed on the first cutting unit (10) through the supporting unit (44).

In another embodiment, the stopping unit (50) has a cover (51) and screw (52). One side surface of the axial hole (15) has a recessed portion (17), which provides a space to receive the cover (51), so the control rod (30) can connect with the cover (51) through one end of the connecting portion (31) along with the screw (52).

In a further embodiment, a restricting slot (18) is formed on the first handle (12) of the first cutting unit (10), and the restricting slot (18) is configured to engage with the control piece (32), so the control rod (30) can restrictively rotate on the first cutting unit (10).

Figure 4:
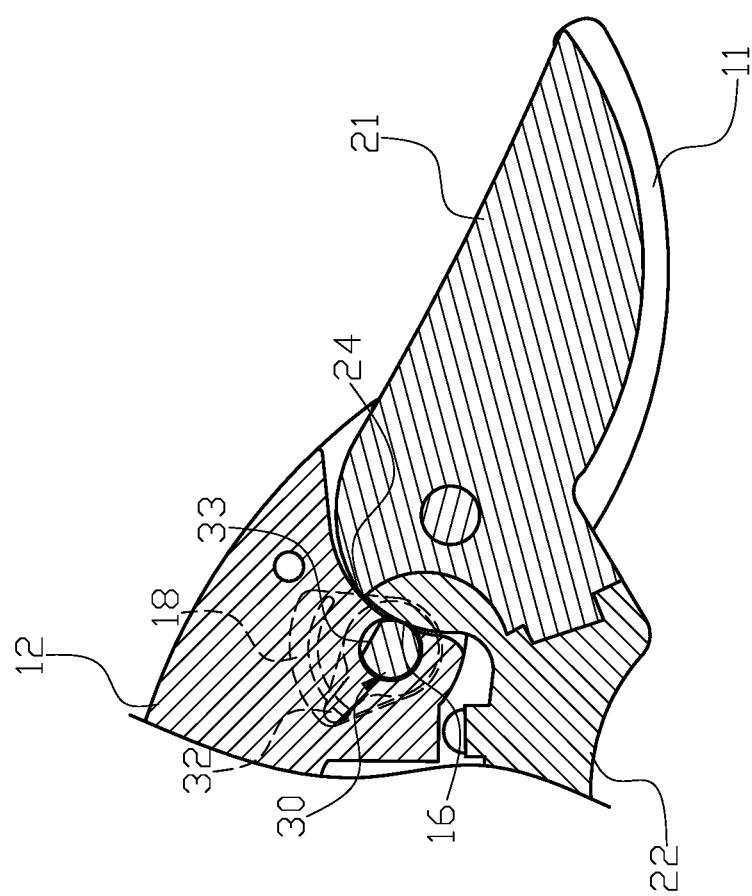
FIG. 4 illustrates a schematic view of the control piece moved to one direction in the present invention.
Figure 5:
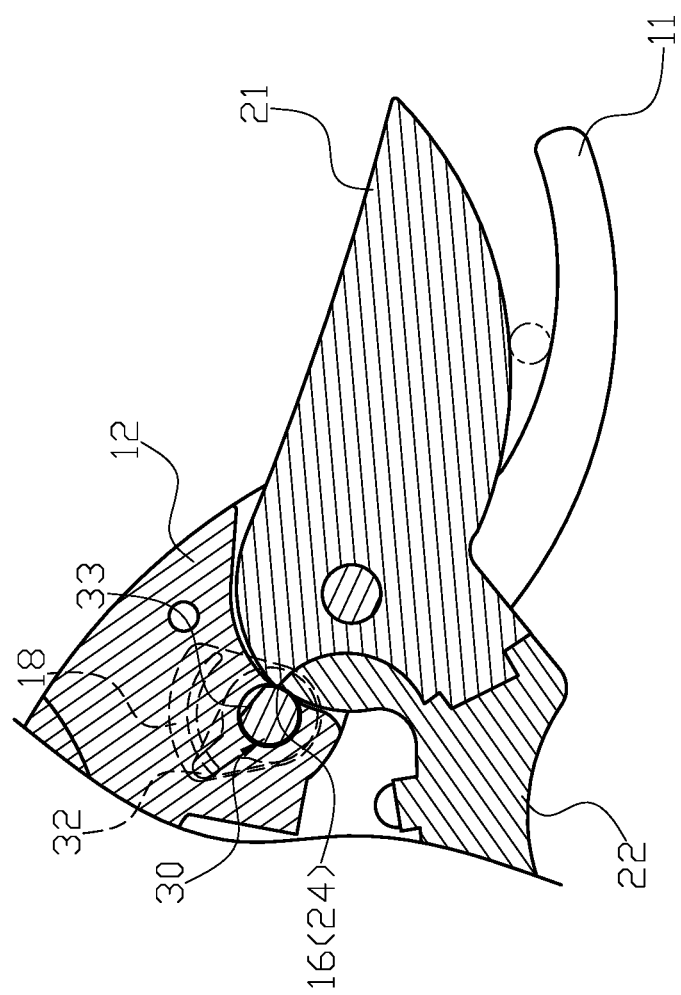
FIG. 5 illustrates a schematic view of cutting a thinner tree branch in the present invention.
Figure 6:
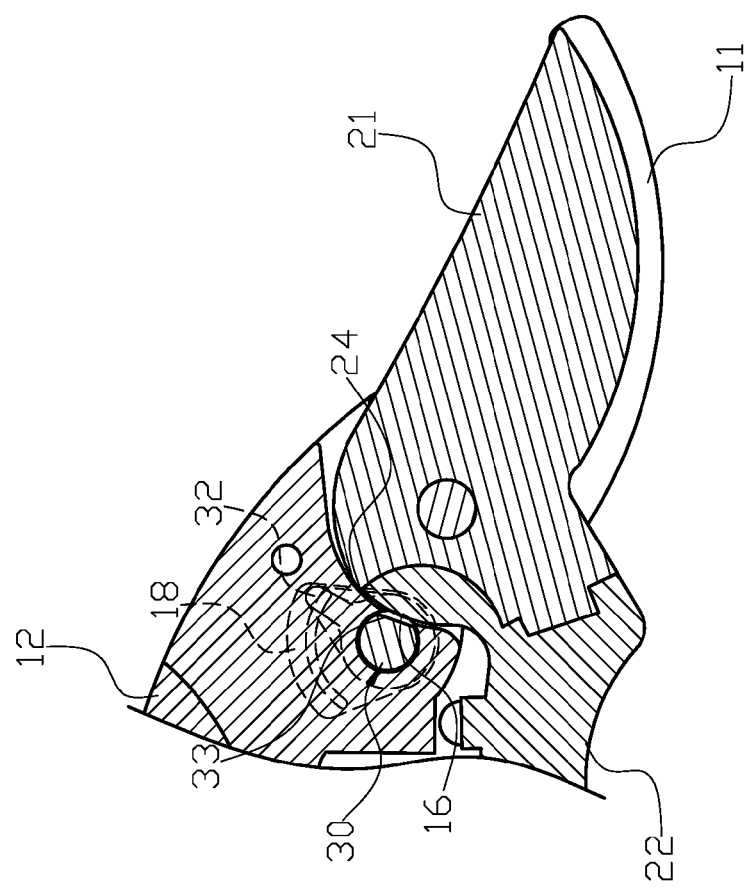
FIG. 6 illustrates a schematic view of the control piece moved to the other direction in the present invention.
Figure 7:
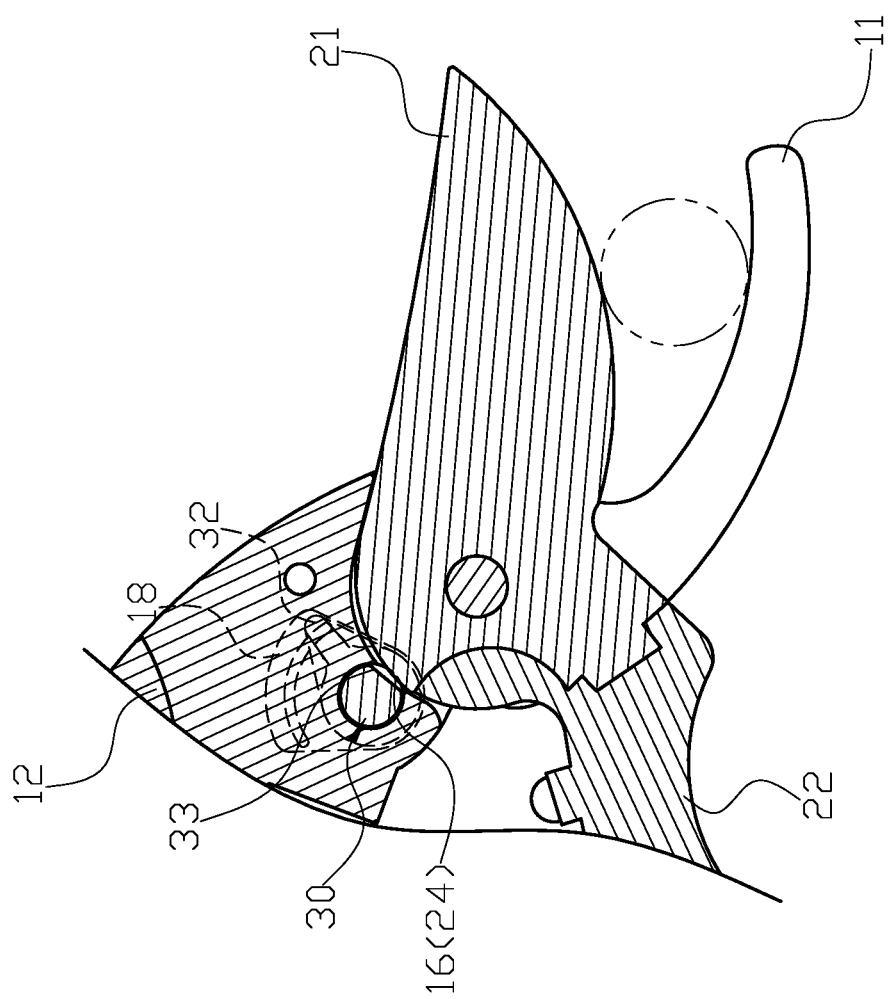
FIG. 7 illustrates a schematic view of cutting a thicker tree branch in the present invention.

When in use, when cutting the branches of the tree, the user can press the first handle (12) and second handle (22) to align the tool portions (11) and (21), and then operate the control piece (32) to drive the edge (33) to move away from the gap (16) (see FIG. 4), so the tool portions (11) and (21) can rotate out from the control rod (30) and be disposed against the extending wing (24) to prevent the tool portion (21) of the second cutting unit (20) from completely open to obtain a smaller cut opening (see FIG. 5). On the other hand, when the tree branches are thicker, the user can also press the first handle (12) and second handle (22) to align the tool portions (11) and (21), and then move the control piece (32) to an opposite direction to align the edge (33) and the gap (16) (see FIG. 6), so the extending wing (24) of the second cutting unit (20) can escape from edge (33) and the tool portion (21) can be completely open to obtain a greater cut opening (see FIG. 7) for thicker tree branches.

Comparing with conventional gardening scissors, the present invention is advantageous because (i) the cut opening of the gardening scissor can be adjusted according to the size of the tree branch, so the user does not have to worry whether the tree branch is too thick to cut; and (ii) since the gardening scissor can used for most of the tree branches, so it is convenient for the user who does not have to prepare multiple scissors.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A gardening scissor comprising a first cutting unit, a second cutting unit, and a control rod,
    wherein the first cutting unit has a first tool portion while the second cutting unit has a second tool portion, and a rear portion of each of the first and second tool portions has a first handle and a second handle respectively, and the first and second handles have first and second through holes respectively for a connecting unit, so that the first cutting unit and second cutting unit are pivotally connected together; and when the first handle and second handle are pressed, the status of the tool portions are changed;
    wherein the first tool portion of the first cutting unit is disposed on one side of the first handle, and a step-shaped space is formed between the first tool portion and first handle to engage the second tool portion of the second cutting unit; an axial hole is formed near the first through hole of the first handle, and one side of the axial hole has a gap to connect with the step-shaped space; an extending wing that is protruding out from the second handle is formed at a rear portion of the second tool portion, so the extending wing is configured to pass through the gap during the second cutting unit's cutting process;
    wherein the control rod has a connecting portion, a control piece, and an edge at a center portion of the control rod, and when the control rod is inserted into the axial hole and connected with a stopping unit through the connecting portion outside the axial hole, the control rod is restricted by the stopping unit and is not allowed to laterally separate from the axial hole, and the control piece is configured to operate the control rod to align or escape the edge with the gap of the first cutting unit,
    wherein the stopping unit has a cover and a screw; one side surface of the axial hole has a recessed portion, which provides a space to receive the cover, so the control rod is configured to connect with the cover through one end of the connecting portion along with the screw,
    wherein a restricting slot is formed on the first handle of the first cutting unit, and the restricting slot is configured to engage with the control piece, so the control rod is configured to restrictively rotate on the first cutting unit.

2. The gardening scissor of claim 1, wherein the first cutting unit and second cutting unit are corresponding to each other as a knife and a knife anvil.

3. The gardening scissor of claim 1, wherein the connecting unit has a latch, a teethed nut, and a locking gear, and the latch is configured to pass through the first through hole and second through hole and then connected with the teethed nut, and when the first handle and second handle are pressed, the teethed nut and the locking gear are engaged.

* * * * *